United States Patent
Kaino et al.

(10) Patent No.: US 10,227,812 B2
(45) Date of Patent: Mar. 12, 2019

(54) OPENING AND CLOSING BODY CONTROL DEVICE FOR VEHICLE

(71) Applicant: Aisin Seiki Kabushiki Kaisha, Kariya-shi (JP)

(72) Inventors: Takashi Kaino, Anjo (JP); Hirotoshi Nakamura, Toyoake (JP); Yasuhiro Awata, Kariya (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 264 days.

(21) Appl. No.: 15/229,152

(22) Filed: Aug. 5, 2016

(65) Prior Publication Data
US 2017/0081897 A1 Mar. 23, 2017

(30) Foreign Application Priority Data
Sep. 17, 2015 (JP) .................. 2015-184424

(51) Int. Cl.
*E05F 15/659* (2015.01)
*E05F 15/41* (2015.01)
*H04L 29/08* (2006.01)
*H04W 4/04* (2009.01)

(52) U.S. Cl.
CPC ............ *E05F 15/659* (2015.01); *E05F 15/41* (2015.01); *E05Y 2400/45* (2013.01); *E05Y 2800/11* (2013.01); *E05Y 2900/531* (2013.01); *H04L 67/12* (2013.01); *H04W 4/046* (2013.01)

(58) Field of Classification Search
CPC .................................................. E05F 15/659
USPC ............................................ 318/59, 53, 34
See application file for complete search history.

(56) References Cited

U.S. PATENT DOCUMENTS

| | | | |
|---|---|---|---|
| 7,061,196 B2 * | 6/2006 | Noro ................... | H02H 7/0851 318/280 |
| 7,339,338 B2 * | 3/2008 | Theile ................. | E05F 15/67 318/466 |
| 7,342,373 B2 * | 3/2008 | Newman ........... | B60H 1/00735 318/280 |

FOREIGN PATENT DOCUMENTS

| | | |
|---|---|---|
| JP | 4560118 | 10/2010 |
| JP | 2013-62725 | 4/2013 |

* cited by examiner

*Primary Examiner* — David S Luo
(74) *Attorney, Agent, or Firm* — Oblon, McClelland, Maier & Neustadt, L.L.P.

(57) ABSTRACT

An opening and closing body control device for a vehicle includes a drive control portion operating a drive control of an opening and closing body by controlling an operation of a drive device, an information communication portion acquiring control information being used for the drive control by a network communication, and a communication state determination portion determining whether the network communication is established. The drive control portion operates a retention control of the opening and closing body in order to retain the opening and closing body at a moved position in a case where the network communication is not established.

6 Claims, 4 Drawing Sheets

OPENING AND CLOSING BODY CONTROL DEVICE FOR VEHICLE

CROSS REFERENCE TO RELATED APPLICATIONS

This application is based on and claims priority under 35 U.S.C. § 119 to Japanese Patent Application 2015-184424, filed on Sep. 17, 2015, the entire content of which is incorporated herein by reference.

TECHNICAL FIELD

This disclosure generally relates to an opening and closing body control device for a vehicle.

BACKGROUND DISCUSSION

A known vehicle includes an in-vehicle network, for example, a Controller Area Network, or a CAN that allows electric control units, or ECUs being provided in the vehicle to intercommunicate with one another. For example, as disclosed in JP2013-62725A (hereinafter, referred to as Patent reference 1), a communication system not only allows all nodes (ECUs) connected to an in-vehicle network to be active simultaneously, but also allows a part of the nodes to be active as required. Because a partial network is established, the power consumption of the whole communication system may be reduced.

However, in a case where the aforementioned communication system is used, it takes a certain amount of time for each of the ECUs to establish the network communication acquiring required control information from an input of an operation trigger. Accordingly, according to an opening and closing body control device for a vehicle, that is, for example, a power sliding door device, the startup of a drive control may delay.

A need thus exists for an opening and closing body control device for a vehicle which is not susceptible to the drawback mentioned above.

SUMMARY

According to an aspect of this disclosure, an opening and closing body control device for a vehicle includes a drive control portion operating a drive control of an opening and closing body by controlling an operation of a drive device, an information communication portion acquiring control information being used for the drive control by a network communication, and a communication state determination portion determining whether the network communication is established. The drive control portion operates a retention control of the opening and closing body in order to retain the opening and closing body at a moved position in a case where the network communication is not established.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
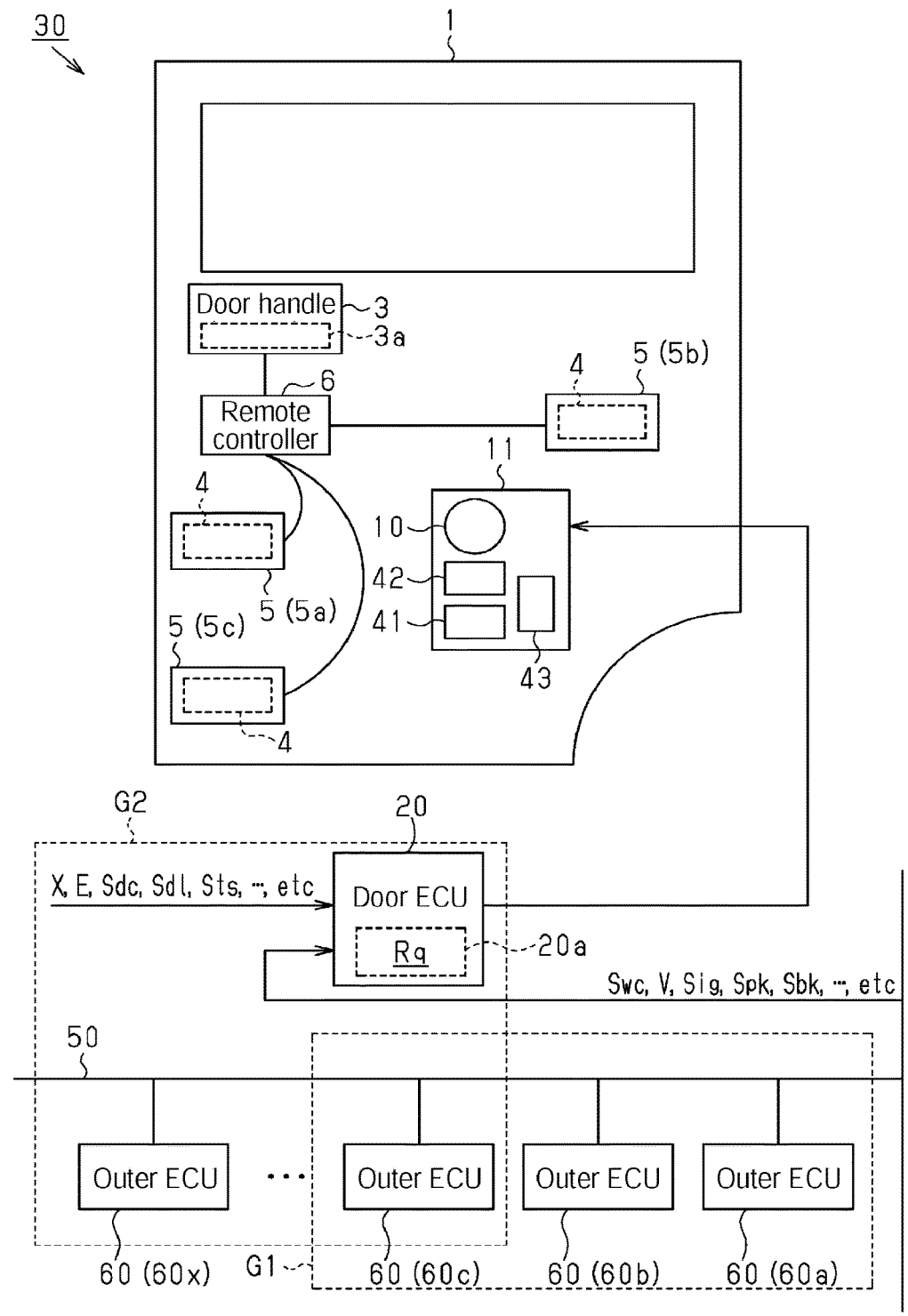
FIG. 1 is a schematic view of a power sliding door device disclosed here.

Hereinafter, an embodiment of an opening and closing body control device for a vehicle that embodies a power sliding door device will be explained with reference to the drawings. As shown in FIG. 1, a sliding door 1 (i.e., serving as an opening and closing body) opens and closes a door opening portion provided at a side surface of the vehicle by moving in front-rear directions while being supported at the side surface of the vehicle. Specifically, the sliding door 1 closes the door opening portion (fully-closed state) by moving in a front direction of the vehicle (left in FIG. 1). The sliding door 1 comes to be in a fully-open state that allows passengers to get on and off via the door opening portion by moving in a rear direction of the vehicle (right in FIG. 1). The sliding door 1 includes a door handle 3 for opening and closing the sliding door 1.

The sliding door 1 includes plural lock devices 5 including a known latch mechanism 4 that engages with a striker provided at a vehicle body in accordance with a moved position of the sliding door 1. Specifically, the sliding door 1 includes a front lock 5a and a rear lock 5b that allow a fully-closed lock retaining the sliding door 1 at the fully-closed position. Moreover, the sliding door 1 includes a fully-open lock 5c for retaining the sliding door 1 at the fully-open position. The lock devices 5 are connected to the door handle 3 via a remote controller 6.

That is, the sliding door 1 of the embodiment releases the engaged state of a latch mechanism 4 that is a part of the lock device 5 by the operation of an operation portion 3a (an outer handle and an inner handle) of the door handle 3. The sliding door 1 may release the engaged state of the latch mechanism 4 that is the part of the lock device 5 by the operation of an operation switch and an operation input portion, for example, a mobile device, provided at an interior of the vehicle. The sliding door 1 of the embodiment opens and closes manually by having the door handle 3 as a grip portion.

The sliding door 1 of the embodiment is provided with a drive device 11 including a motor 10 as a drive source. The operation of the drive device 11 is controlled by a door electric control unit 20, or a door ECU 20 (i.e., serving as a drive control portion, an information transmission portion, a transmission state determination portion, a standby operation request retention portion, and a standby operation request update portion). According to the embodiment, a power sliding door device 30 (i.e., serving as an opening and closing body control device for a vehicle) is provided as the opening and closing body control device for the vehicle that opens and closes the sliding door 1 in response to the drive force of the motor 10.

Specifically, the drive device 11 of the embodiment includes an opening and closing drive portion 41 that allows the sliding door 1 to open and close via a drive cable by rotating in response to the drive force of the motor 10. The drive device 11 includes an electromagnetic clutch 42 that connects and disconnects the drive force of the motor 10, the drive force that is transmitted to the sliding door 1 via the opening and closing drive portion 41. Specifically, the electromagnetic clutch 42 connects a torque transmission passage between the motor 10 and the opening and closing drive portion 41 by energization (active operation). Accordingly, the power sliding door device 30 of the embodiment opens and closes the sliding door 1 smoothly even when the manual operation that does not operate the drive control of the motor 10 is operated.

The door ECU 20 of the embodiment is connected to sensors provided at the sliding door 1. The door ECU 20 detects the various control information used for the drive control of the sliding door 1 in response to output signals of the sensors.

For example, the drive device 11 of the embodiment includes a pulse sensor 43 outputting pulse signals that are synchronized with the movement of the opening and closing drive portion 41, that is, the movement of the sliding door 1. The door ECU 20 of the embodiment detects a moved position X (and a movement speed) of the sliding door 1 by counting the pulse signals.

The door ECU 20 of the embodiment detects a control electric voltage E of the door ECU 20 in response to output signals of an electric voltage sensor. An operation input signal Sdc, a door lock signal Sdl, and an output signal Sts are inputted to the door ECU 20. The operation input signal Sdc is provided at the door handle 3 or the operation switch provided at the interior of the vehicle. The door lock signal Sdl shows the lock state of the lock device 5. The output signal Sts of the touch sensor provided at the sliding door 1 for detecting whether the sliding door 1 catches an object is inputted.

The door ECU 20 of the embodiment is connected to an in-vehicle network 50 that is established in the vehicle. That is, the door ECU 20 operates the network communication with plural outer ECUs 60 being connected to the in-vehicle network 50, and uses the control information acquired by the network communication for the drive control of the sliding door 1.

For example, the door ECU 20 of the embodiment acquires the vehicle speed V and an operation input signal Swc via a mobile device by operating the network communication. The door ECU 20 acquires an ignition signal Sig, a brake signal Sbk, and a parking signal Spk of the vehicle, the parking signal Spk showing that the vehicle is in a parked state (at a shift position or a brake state) via the outer ECU 60 by the network communication.

Here, the communication system of the vehicle having the power sliding door device 30 of the embodiment not only activates all the nodes (ECUs) connected to the in-vehicle network 50 simultaneously, but also activates a part of the nodes as required.

Specifically, according to the in-vehicle network 50 of the embodiment as a partial network, outer ECUs 60a, 60b, 60c belong to a first startup control group G1. The door ECU 20, and outer ECUs 60c, 60x belong to a second startup control group G2.

That is, for example, the outer ECUs 60c, 60x belonging to the second startup control group G2 same as the door ECU 20 may be in a sleep mode with the door ECU 20. Because the outer ECUs 60a, 60b of the outer ECUs 60a, 60b, 60c belonging to the first startup control group G1 do not belong to the second startup control group G2 to which the door ECU 20 belongs, the outer ECUs 60a, 60b may be in a sleep mode even when the door ECU 20 is in a wake-up mode. The door ECU 20 may be in a sleep mode even when the outer ECUs 60a, 60b, 60c belonging to the first startup control group G1 are in a wake-up mode.

In the in-vehicle network 50 including the nodes in a wake-up mode and the nodes in a sleep mode in a mixed manner, the door ECU 20 of the embodiment determines whether the network communication for acquiring the control information used for the drive control of the sliding door 1 is established, that is, whether the node with which the door ECU 20 communicates is in a wake-up mode. In a case where the network communication is not established, the door ECU 20 does not operate the normal drive control in response to the operation request until the network communication is established.

Figure 2:
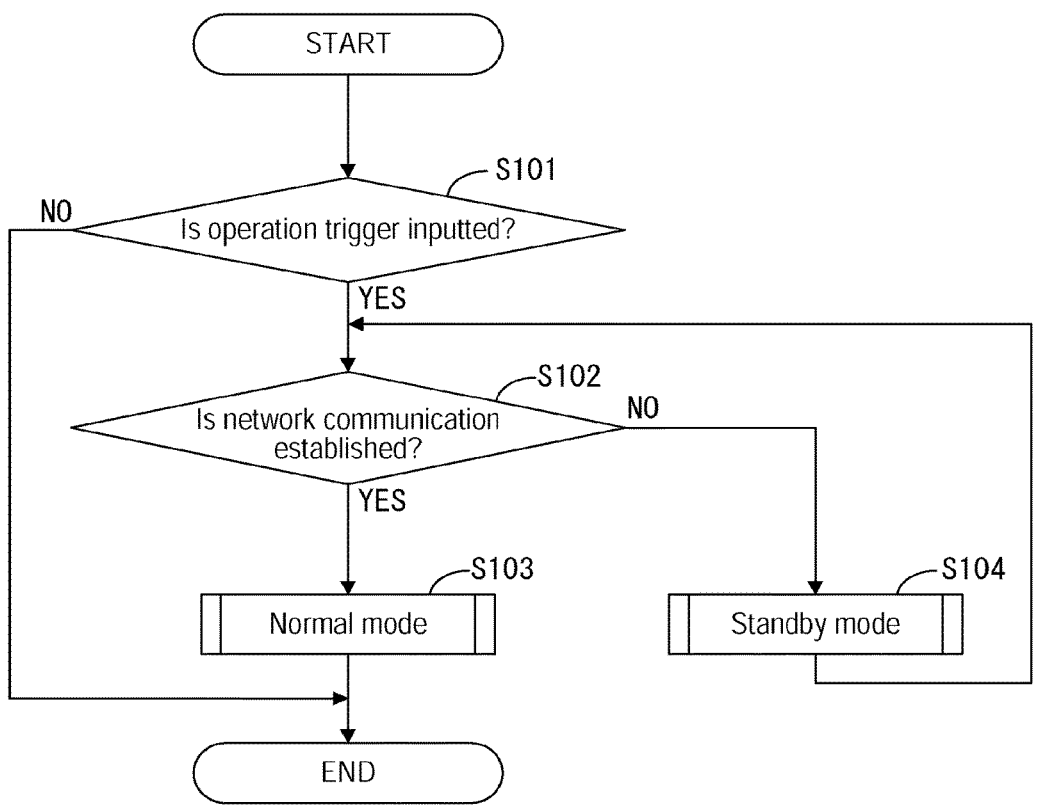
FIG. 2 is a flowchart illustrating operation procedures of a startup determination process of a drive control of the sliding door.

Specifically, as shown in a flowchart in FIG. 2, in a case where an operation trigger is inputted to startup the drive control of the sliding door 1 (Step 101: YES), the door ECU 20 of the embodiment determines whether the network communication for acquiring the control information required for the operation of the drive control is established individually (Step 102). According to the door ECU 20 of the embodiment, in addition to the operation input signal Sdc generated by the operation switch and the operation input signal Swc generated by the network communication, the input of the door lock signal Sdl showing that the lock device 5 is unlocked by the operation of the operation portion 3a of the door handle 3 works as the operation trigger. The door ECU 20 of the embodiment operates the drive control of the sliding door 1 (normal mode, Step 103) shown by the operation request in a case where the door ECU 20 determines that the network communication is established in Step 102 (Step 102: YES).

Figure 3:
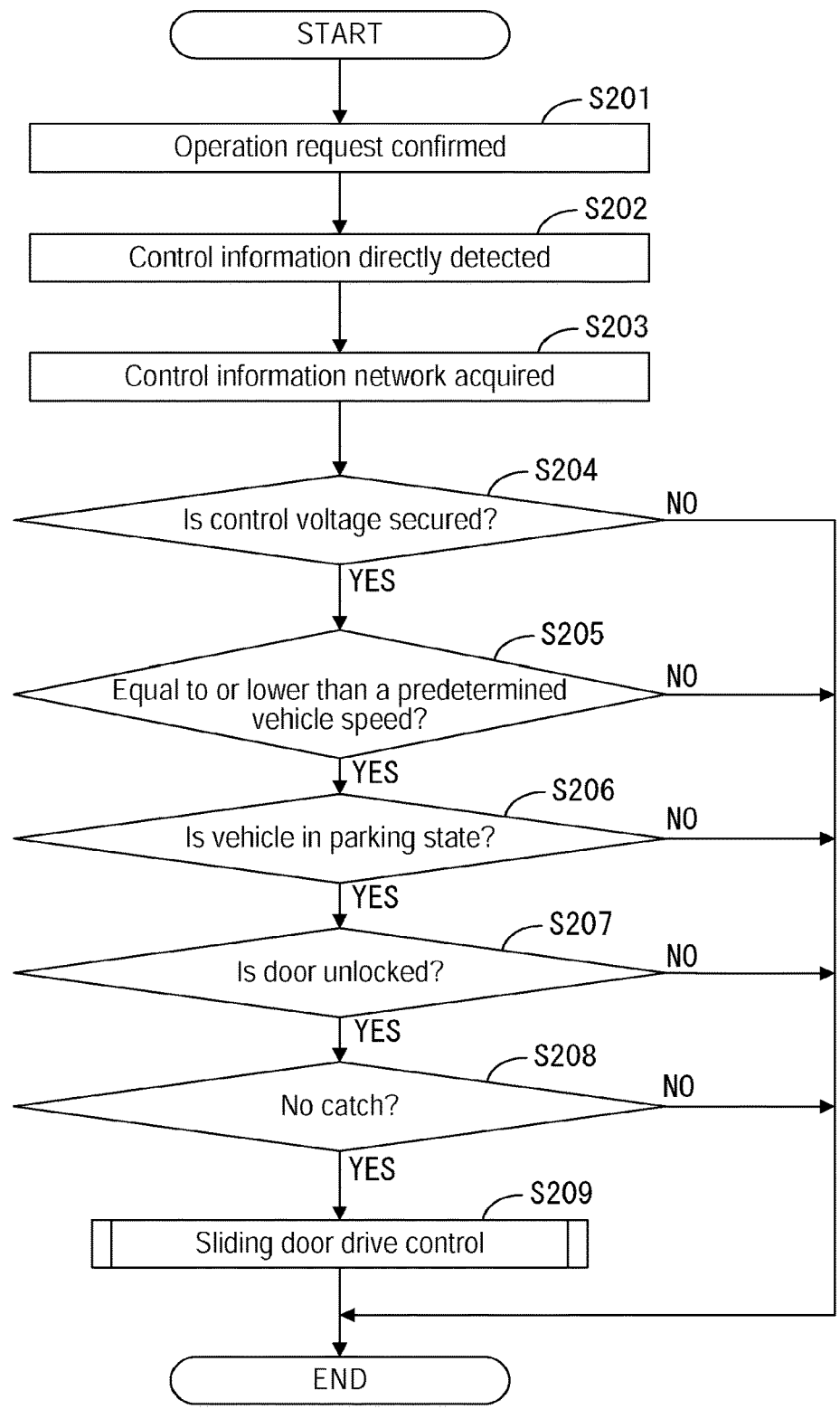
FIG. 3 is a flowchart illustrating operation procedures in a normal mode.

As shown in a flowchart in FIG. 3, in a case where the door ECU 20 is in a normal mode and confirms the operation request (Step 201), the door ECU 20 detects the control information in response to output signals of the sensors (Step 202), and acquires the control information by the network communication (Step 203). The door ECU 20 determines whether an operation permission condition for operating the drive control of the sliding door 1 is established in response to the various control information detected directly and acquired via the in-vehicle network 50 (Steps 204 to 208).

For example, the door ECU 20 determines whether the control electric voltage E supplied to the door ECU 20 is greater than a predetermined electric voltage (Step 204). The door ECU 20 determines whether the vehicle speed V is equal to or less than a predetermined speed (Step 205), and determines whether the vehicle is in a parked state (Step 206). The door ECU 20 determines whether the sliding door 1 is in an unlocked state (a door lock is released) by the lock device 5 (Step 207), and determines whether the sliding door 1 catches an object (Step 208). In a case where the determination conditions of the Steps 204 to 208 are established (all Steps: YES), the door ECU 20 operates the drive control of the sliding door 1 in response to the operation request confirmed in Step 101 (Step 209).

As shown in FIG. 2, in a case where the door ECU 20 determines that the network communication is not established in Step 102 (Step 102: NO), that is, in a case where the door ECU 20 determines that there is the node not turning to a wake-up mode when acquiring the control information, the door ECU 20 is turned to a standby mode (Step 104). That is, the door ECU 20 maintains the inputted operation request as a standby operation request Rq at a storage area 20a (see FIG. 1). After the transition to the normal mode in Step 103, the door ECU 20 operates the drive control of the sliding door 1 in accordance with the standby operation request Rq. The door ECU 20 operates the specific control for an exclusive standby mode in Step 104 until the network communication is established.

Figure 4:
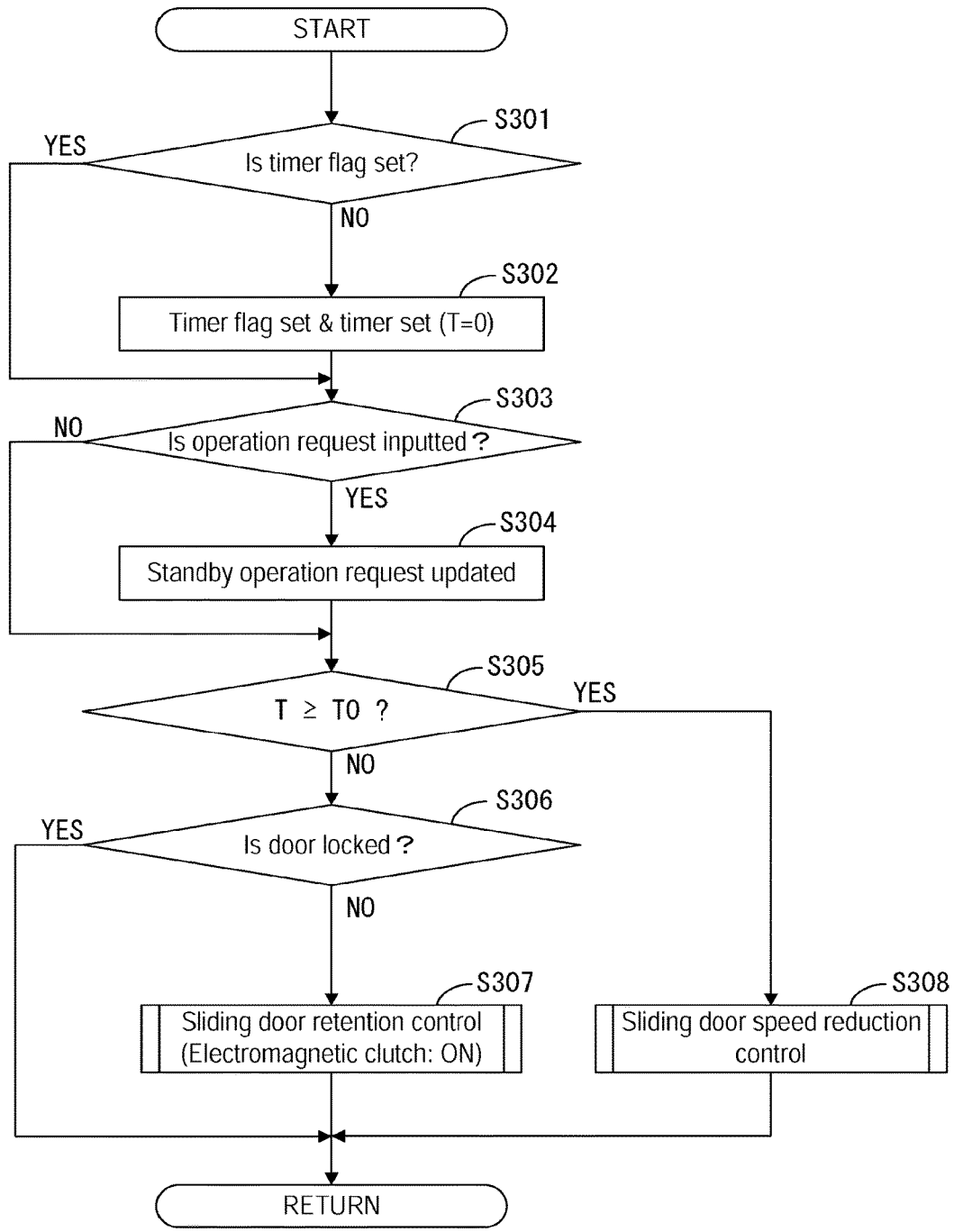
FIG. 4 is a flowchart illustrating operation procedures in a standby mode.

Specifically, as shown in FIG. 4, the door ECU 20 determines whether a timing flag is set (Step 301) in a case where the door ECU 20 turns to the standby mode (see FIG.

2, Step 104). In a case where the timing flag is not set (Step 301: NO), the door ECU sets the timing flag, and sets a timer for timing (Time T=0, Step 302). In a case where the timing flag is set in Step 301 (Step 301: YES), the process of Step 302 is not operated.

Next, the door ECU 20 determines whether a new operation request is inputted (Step 303), and in a case where the new operation request is inputted (Step 303: YES), the door ECU 20 updates the standby operation request Rq stored in the memory area 20a. That is, the door ECU 20 accepts the change of the operation request even in the standby mode. Accordingly, according to the power sliding door device 30, the drive control of the sliding door 1 operated after the transition to the normal mode comes to be along the intention of a user.

The door ECU 20 determines whether a predetermined time T0 elapses from a point where the timing flag is set in Step 302, that is, where the door ECU 20 turns to the standby mode (Step 305). In a case where the predetermined time T0 does not elapse (T<T0, Step 305: NO), the door ECU 20 determines whether the lock device 5 is in a locked state (Step 306). In a case where the lock device 5 is not in a locked state (Step 306: NO), that is, in a case where the sliding door 1 is not in a locked state where the sliding door 1 is retained unmovable by the lock device 5, the door ECU 20 operates the retention control of the sliding door 1 in order to retain the sliding door 1 at the moved position X (Step 307).

Specifically, the door ECU 20 turns on the electromagnetic clutch 42 provided at the drive device 11 in Step 307. That is, because the door ECU 20 turns on the electromagnetic clutch 42 and connects the torque transmission passage between the motor 10 and the opening and closing drive portion 41, the door ECU 20 applies a load on the sliding door 1 to inhibit the sliding door 1 from moving in response to frictional force of, for example, a cogging torque of the motor 10 or a reduction mechanism. Accordingly, the power sliding door device 30 inhibits the sliding door 1 from moving by the gravity during a movement mode, that is, until the network communication is established.

In a case where the door ECU 20 determines that the lock device 5 is in a locked state in Step 306 (Step 306: YES), that is, in a case where the sliding door 1 is in a locked state where the sliding door 1 is retained unmovable by the lock device 5, the door ECU 20 does not retain the sliding door 1 in Step 307. Accordingly, in a case where the sliding door 1 rarely moves by the gravity, the power consumption is reduced because the power sliding door device 30 does not energize the electromagnetic clutch 42.

In a case where the door ECU 20 determines that the predetermined time T0 elapses from a point where the timing flag is set (T is equal to or greater than T0, Step 305: YES), that is, in a case where the network communication is not established for equal to or longer than the predetermined time T0 after the transition to the standby mode, the door ECU 20 does not operate the processes of Step 306 and Step 307. The door ECU 20 operates the speed reduction control reducing the movement speed of the sliding door 1 (Step 308).

Specifically, in a case where the movement speed of the sliding door 1 comes to be greater than the predetermined speed, the door ECU 20 turns on the electromagnetic clutch 42 of the drive device 11 intermittently. In a case where the movement speed of the sliding door 1 comes to be less than the predetermined speed, the door ECU 20 turns off the electromagnetic clutch 42. The power sliding door device 30 opens and closes the sliding door 1 by the manual operation while reducing the movement speed of the sliding door 1.

According to the embodiment, following effects and advantages may be attained.

The door ECU 20 serving as an information communication portion acquires the control information used for the drive control of the sliding door 1 as an opening and closing body by the network communication. The door ECU 20 serving as a communication state determination portion determines whether the network communication is established. In a case where the network communication is not established, the door ECU 20 serving as a drive control portion controls the retention of the sliding door 1 in order to retain the sliding door 1 at the moved position X.

That is, in a case where the vehicle is parked at a slope land, the sliding door 1 may start moving by the gravity because the startup of the drive control delays. However, according to the aforementioned construction, the sliding door 1 may be inhibited from moving by the gravity even in a case where the establishment of the network communication acquiring the control information required for the drive control of the sliding door 1 takes a certain amount of time. Accordingly, high safety and high-grade feel may be secured.

The drive device 11 drives the sliding door 1 by the motor 10 as a drive source, and includes the electromagnetic clutch 42 connecting and disconnecting the transmission of the drive force relative to the sliding door 1. The door ECU 20 operates the retention control of the sliding door 1 by applying the load on the sliding door 1 to inhibit the sliding door 1 from moving by engaging the electromagnetic clutch 42.

That is, because the electromagnetic clutch 42 provided at the drive device 11 comes to be in an engaged state, the load may be applied to the sliding door 1 to inhibit the sliding door 1 from moving in response to, for example, the cogging torque of the motor 10 or the frictional force of the reduction mechanism. Accordingly, the moved position X of the sliding door 1 may be retained while reducing the power consumption by the motor energization.

In a case where the door ECU 20 determines that the lock device 5 is in a locked state, that is, in a case where the sliding door 1 is retained unmovable by the lock device 5, the door ECU 20 does not retain the sliding door 1.

That is, in a case where the sliding door 1 is in a locked state, the sliding door 1 merely moves by the gravity. Thus, in a case where the sliding door 1 is in a locked state, because the door ECU 20 does not energize the electromagnetic clutch 42, the power consumption may be reduced.

In a case where the network communication is not established for equal to or longer than the predetermined time T0, the door ECU 20 operates the speed reduction control reducing the movement speed of the sliding door 1.

Accordingly, the security may be highly secured while allowing the manual operation of the sliding door 1. Thus, the convenience to the user may be enhanced.

The door ECU 20 serving as a standby operation request retention portion retains the inputted operation request to the memory area 20a as the standby operation request Rq. After the network communication is established, the door ECU 20 operates the drive control of the sliding door 1 in response to the standby operation request Rq. In a case where a new operation request is inputted in a state where the network communication is not established, the door ECU 20 serving as the standby operation request retention portion updates the standby operation request Rq retained at the memory area 20a.

That is, because the change of the operation request is accepted, the drive control of the sliding door 1 may be operated along the intention of the user after the network communication is established. Accordingly, the convenience to the user may be enhanced.

The aforementioned embodiment may be changed as follows.

According to the aforementioned embodiment, the opening and closing body control device for the vehicle embodies the power sliding door device 30 opening and closing the sliding door 1 provided at a side of the vehicle. Alternatively, this disclosure may be applied to an opening and closing body control device for a vehicle that is targeted on an opening and closing body, for example, a sunroof device, in addition to the sliding door.

According to the aforementioned embodiment, because the door ECU 20 turns on the electromagnetic clutch 42 of the drive device 11 to connect the transmission of the drive force relative to the sliding door 1, the door ECU 20 operates the retention control of the sliding door 1. Alternatively, the sliding door 1 may be applied with the braking force by, for example, a regeneration brake control or an energized phase fixed control. Accordingly, even in a case where the drive device 11 does not include the electromagnetic clutch 42, the retention control of the sliding door 1 may be operated.

A type of the clutch that connects and disconnects the transmission of the drive force relative to the sliding door 1 is not limited to the electromagnetic clutch 42. For example, a mechanical type or an oil-pressure type may be applied.

According to the aforementioned embodiment, in a case where the sliding door 1 is retained unmovable by the lock device 5, the retention of the sliding door 1 is not operated. Alternatively, such condition determination does not necessarily have to be operated.

According to the aforementioned embodiment, in a case where the network communication is not established for equal to or greater than the predetermined time T0, the speed reduction control reducing the movement speed of the sliding door 1 is operated. Alternatively, the retention control may be continued.

According to the aforementioned embodiment, the opening and closing body control device (the power sliding door device 30) for the vehicle includes the drive control portion (the door ECU 20) operating the drive control of the opening and closing body (the sliding door 1) by controlling the operation of the drive device (11), the information communication portion (the door ECU 20) acquiring control information being used for the drive control by the network communication, and the communication state determination portion (the door ECU 20) determining whether the network communication is established. The drive control portion (the door ECU 20) operates the retention control of the opening and closing body (the sliding door 1) in order to retain the opening and closing body (the sliding door 1) at the moved position (X) in a case where the network communication is not established.

According to the aforementioned embodiment, the drive device (11) includes the clutch (the electromagnetic clutch 42) connecting and disconnecting the transmission of the drive force relative to the opening and closing body (the sliding door 1) while driving the opening and closing body (the sliding door 1) by a motor (10) that serves as a drive source. The drive control portion (the door ECU 20) operates the retention control of the opening and closing body (the sliding door 1) by applying a load on the opening and closing body (the sliding door 1) to inhibit the opening and closing body (the sliding door 1) from moving by engaging the clutch (the electromagnetic clutch 42).

According to the aforementioned embodiment, the drive control portion (the door ECU 20) does not operate the retention control of the opening and closing body (the sliding door 1) in a case where the opening and closing body (the sliding door 1) is unmovably retained by the lock device (5).

According to the aforementioned embodiment, the drive control portion (the door ECU 20) operates the speed reduction control reducing the movement speed of the opening and closing body (the sliding door 1) in a case where the network communication is not established for equal to or longer than a predetermined time.

According to the aforementioned embodiment, the drive control portion (the door ECU 20) engages the clutch (the electromagnetic clutch 42) intermittently. The drive control portion (the door ECU 20) disengages the clutch (the electromagnetic clutch 42) to operate the speed reduction control in a case where the movement speed of the opening and closing body is less than a predetermined speed.

According to the aforementioned embodiment, the opening and closing body control device (the power sliding door device 30) for the vehicle further includes the standby operation request retention portion (the door ECU 20) retaining an operation request as the standby operation request (Rq), the operation request being inputted be performed by the drive control portion (the door ECU 20) after the network communication is established, the standby operation request update portion (the door ECU 20) updating the standby operation request (Rq) in a case where a new operation request is inputted before the network communication is established.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An opening and closing body control device for a vehicle, comprising:
   a drive control portion operating a drive control of an opening and closing body by controlling an operation of a drive device;
   an information communication portion acquiring control information being used for the drive control by a network communication; and
   a communication state determination portion determining whether the network communication is established;
   wherein the drive control portion operates a retention control of the opening and closing body in order to retain the opening and closing body at a moved position in a case where the network communication is not established, and
   wherein the drive device includes a clutch connecting and disconnecting a transmission of a drive force relative to the opening and closing body while driving the opening and closing body by a motor that serves as a drive source; and the drive control portion operates the retention control of the opening and closing body by applying a load on the opening and closing body to inhibit the opening and closing body from moving by engaging the clutch.

2. The opening and closing body control device for the vehicle according to claim 1, wherein the drive control portion does not operate the retention control of the opening and closing body in a case where the opening and closing body is unmovably retained by a lock device.

3. The opening and closing body control device for the vehicle according to claim 1, wherein the drive control portion operates a speed reduction control reducing a movement speed of the opening and closing body in a case where the network communication is not established for equal to or longer than a predetermined time.

4. The opening and closing body control device for the vehicle according to claim 1, wherein the drive control portion operates a speed reduction control reducing a movement speed of the opening and closing body in a case where the network communication is not established for equal to or longer than a predetermined time.

5. The opening and closing body control device for the vehicle according to claim 4, wherein
   the drive control portion engages the clutch intermittently; and
   the drive control portion disengages the clutch to operate the speed reduction control in a case where the movement speed of the opening and closing body is less than a predetermined speed.

6. The opening and closing body control device for the vehicle according to claim 1, further comprising:
   a standby operation request retention portion retaining an operation request as a standby operation request, the operation request being inputted be performed by the drive control portion after the network communication is established; and
   a standby operation request update portion updating the standby operation request in a case where a new operation request is inputted before the network communication is established.

* * * * *